United States Patent [19]

Ishimaru et al.

[11] Patent Number: 5,695,884
[45] Date of Patent: Dec. 9, 1997

[54] THERMOPLASTIC POLYURETHANE

[75] Inventors: Futoshi Ishimaru; Satoshi Nakamura; Chikara Sugitawa; Osamu Imagawa, all of Ohtsu, Japan

[73] Assignee: Toyo Boseki Kabushiki Kaisha, Japan

[21] Appl. No.: 457,275

[22] Filed: Jun. 1, 1995

Related U.S. Application Data

[63] Continuation of Ser. No. 201,747, Feb. 25, 1994, abandoned.

[30] Foreign Application Priority Data

| Mar. 1, 1993 | [JP] | Japan | 5-039950 |
| Mar. 12, 1993 | [JP] | Japan | 5-052220 |
| Mar. 12, 1993 | [JP] | Japan | 5-052221 |

[51] Int. Cl.$^6$ .................................. C08G 18/32
[52] U.S. Cl. .................. 428/423.1; 525/440; 525/444; 525/453; 525/454; 528/85; 428/423.1; 428/425.9; 428/692; 428/900
[58] Field of Search ................... 525/440, 444, 525/453, 454; 528/85; 428/900, 423.1, 425.9, 692

[56] References Cited

U.S. PATENT DOCUMENTS

| 4,152,485 | 5/1979 | Mizumura et al. | 428/425 |
| 5,278,275 | 1/1994 | Yatsuka et al. | 325/74 |

*Primary Examiner*—W. Robinson H. Clark
*Attorney, Agent, or Firm*—Leydig, Voit & Mayer, Ltd.

[57] ABSTRACT

A thermoplastic polyurethane composition of the present invention includes a thermoplastic polyurethane obtained by reacting at least the following components A, B, and C: (A) a polyester polyol having a number average age molecular weight of 500 to 5000, containing an acid component including aromatic dicarboxylic acid and aliphatic dicarboxylic acid, the molar ratio of the aromatic dicarboxylic acid to the aliphatic dicarboxylic acid being 5:95 to 90:10; (B) a low molecular weight diol having a molecular weight of less than 500; and (C) an organic diisocyanate, wherein the thermoplastic polyurethane has a metal sulfonate group of 10 to 1000 equivalents/$10^6$ g of the polyurethane and a urethane group of 1200 to 3000 equivalents/$10^6$ g of the polyurethane.

18 Claims, No Drawings

THERMOPLASTIC POLYURETHANE

This a continuation of application Ser. No. 08/201,747 filed on Feb. 25, 1994 now abandoned.

BACKGROUND OF THE INVENTION

1. Field of the Invention

The present invention relates to a thermoplastic polyurethane useful as a binder for a magnetic recording medium and the like, being capable of satisfactorily dispersing fine magnetic particles and enabling the fine magnetic particles to be packed with high density in a magnetic layer of the magnetic recording medium.

2. Description of the Related Art

As a binder for a magnetic recording medium, various materials have been used, such as ethyl cellulose, nitrocellulose, polyvinylidene chloride, vinyl chloride-vinyl acetate copolymer, styrene-butadiene copolymer, butadiene-acrylonitrile copolymer, polymethyl methacrylate, vinylidene chloride-methyl methacrylate copolymer, polyurethane, epoxy resin, and polyester. However, these materials are not sufficiently suitable for the preparation of a magnetic recording medium, such as a data tape and a floppy disk for a computer, and a video tape, which requires high performance. In particular, recently, highly graded video tapes have been progressively developed; therefore, a magnetic recording medium capable of high-density recording, thus enabling recording and reproducing of a clear sound and image has been required.

For high-density recording, the following has been tried: Magnetic particles are made fine and highly magnetized, end the packing density of the magnetic particles in a magnetic layer is increased. However, in the case where the magnetic particles are made fine, a specific surface area of each magnetic particle increases, and in the case where the magnetic particles are highly magnetized, the aggregation of the magnetic particles increases. Under these circumstances, the magnetic particles are not satisfactorily dispersed in the above-mentioned conventional binder. In overcoming this problem, a dispersant such as a phosphoric compound has been used. However, when the dispersant is mixed with the binder, the dispersant is bled out of the binder after the magnetic recording medium including such a binder is used for a long period of time, adversely affecting the durability of the magnetic recording medium.

Considering the above-mentioned problem, binders having a high dispersing property have been proposed. In this case, the compatibility of the binder with the magnetic particles is improved by introducing a hydrophilic group, such as a sulfonic group, a hydroxyl group, a carboxyl group, and a phosphoric group, into a polymer for the binder. Among these binders, a binder having a sulfonic group has excellent dispersing properties for the magnetic particles. However, such a binder having a sulfonic group is expensive. The reason for this is as follows:

In general, the above-mentioned binder is prepared by a known solution polymerization method using an organic solvent as a reaction medium. Therefore, the binder product thus obtained is in a solution or in a varnish state; its solid content, i.e., its effective component is only part of the product. This causes the transportation cost of the product to increase.

In addition, such a binder in a solution is transported while containing an inflammable organic solvent; this causes problems in terms of safety. Moreover, in the case where such a binder is used for a magnetic coating, a solvent which is selected in accordance with a solvent recovering device for producing a magnetic recording medium using the magnetic coating should be used as a reaction medium of the solution polymerization for preparing the binder. The reason for this is that such a binder in a reaction medium is generally used as a magnetic coating without removing the reaction medium.

Under the above-mentioned circumstances, a binder for a magnetic recording medium which can be treated in a solid state has been desired; various kinds of binders in a solid state have been proposed. However, these binders in a solid state are not capable of uniformly dispersing magnetic particles. In addition, when these binders are used for preparing a magnetic coating, the magnetic particles are not packed with high density in a magnetic layer made of the magnetic coating. The surface smoothness and low voids of the magnetic layer are not obtained.

SUMMARY OF THE INVENTION

The thermoplastic polyurethane composition of this invention, comprises a thermoplastic polyurethane obtained by reacting at least the following components A, B, and C:

(A) a polyester polyol having a number average molecular weight of 500 to 5000, containing an acid component including aromatic dicarboxylic acid and aliphatic dicarboxylic acid, the molar ratio of the aromatic dicarboxylic acid to the aliphatic dicarboxylic acid being 5:95 to 90:10;

(B) a low molecular weight diol having a molecular weight of less than 500; and (C) an organic diisocyanate, wherein the thermoplastic polyurethane has a metal sulfonate group of 10 to 1000 equivalents/$10^6$ g of the polyurethane and a urethane group of 1200 to 3000 equivalents/$10^6$ g of the polyurethane.

In one embodiment of the present invention, the number average molecular weight of the polyester polyol is in the range of 500 to 2000.

In another embodiment of the present invention, the above-mentioned thermoplastic polyurethane composition comprises a higher aliphatic acid metal salt in an amount of 0.01 to 1.0 part by weight based on 100 parts by weight of the thermoplastic polyurethane.

In another embodiment of the present invention, the above-mentioned thermoplastic polyurethane composition comprises at least one compound selected from the group consisting of an organic tin compound and tertiary amine in an amount of 0.001 to 0.1 part by weight based on 100 parts by weight of the thermoplastic polyurethane.

In another embodiment of the present invention, the above-mentioned thermoplastic polyurethane has a melt viscosity of 1000 to 20000 poises at 200° C.

According to another aspect of the present invention, a magnetic recording medium comprises a substrate and a magnetic layer formed on the substrate, wherein the magnetic layer includes magnetic particles and a binder, and the binder includes the above-mentioned thermoplastic polyurethane composition.

Thus, the invention described herein makes possible the advantages of (1) providing a thermoplastic polyurethane composition which is capable of uniformly dispersing magnetic particles, when being used for a binder of a magnetic coating; in a magnetic layer made of the magnetic coating, the magnetic particles are packed with high density; high surface smoothness and low voids of the magnetic layer are obtained; (2) providing a thermoplastic polyurethane composition in a solid state, having the above excellent properties because of having a sulfonic group contained in the polyurethane in the composition; (3) providing a thermoplastic polyurethane composition in a solid state having a sulfonic group, capable of being easily treated (i.e., easily transported and stored), since no solvent is contained; and (4) providing a magnetic recording medium having a magnetic layer in which magnetic particles are packed with high density and are uniformly dispersed, the magnetic layer having surface smoothness and low voids.

These and other advantages of the present invention will become apparent to those skilled in the art upon reading and understanding the following detailed description.

DESCRIPTION OF THE PREFERRED EMBODIMENTS

The number average molecular weight of a polyester polyol used for the preparation of a thermoplastic polyurethane contained in a composition of the present invention is in the range of 500 to 5000. In the case where the number average molecular weight of the polyester polyol is less than 500, the flexibility of the thermoplastic polyurethane to be obtained decreases; thus, it is not practical to use such a polyester polyol. On the other hand, in the case where the number average molecular weight of the polyester polyol is more than 5000, the melt viscosity of the polyester polyol increases, resulting in a decrease in flowability; it becomes difficult to produce a thermoplastic polyurethane. In addition, in this case, the crystallinity of the polyester polyol that forms a soft segment of the thermoplastic polyurethane increases, resulting in a decrease in the solubility of the polyurethane in a solvent. For these reasons, the number average molecular weight is preferably in the range of 500 to 2000.

An acid component in the polyester polyol contains an aromatic dicarboxylic acid component and an aliphatic dicarboxylic acid component. The molar ratio of the aromatic dicarboxylic acid component to the aliphatic dicarboxylic acid component is 5/95 to 90/10, and preferably 30/70 to 70/30. In the case where the molar ratio of the aromatic dicarboxylic acid to the aliphatic dicarboxylic acid is less than 5/95, the thermoplastic polyurethane obtained becomes too soft. For example, when the thermoplastic polyurethane thus obtained is in a pellet shape, the pellets stick to each other; namely, blocking occurs. Thus, the polyester polyol containing the aromatic dicarboxylic acid and the aliphatic dicarboxylic acid in such a ratio is not practical from the viewpoint of the production of a thermoplastic polyurethane and the treatment thereof. On the other hand, in the case where the molar ratio of the aromatic dicarboxylic acid component to the aliphatic dicarboxylic acid component is more than 90/10, the rigidity of the polyester polyol increases, resulting in a high softening point and high viscosity of the polyester polyol; as a result, it becomes difficult to produce the thermoplastic polyurethane. In addition, the solubility of the thermoplastic polyurethane to be obtained in a solvent decreases, or even though the thermoplastic polyurethane can be dissolved in a solvent, the thermoplastic polyurethane will have decreased miscibility with other resins used together with the polyurethane, such as with a vinyl chloride resin. Therefore, a binder having a resulting thermoplastic polyurethane composition does not satisfactorily disperse magnetic particles; and thus, the magnetic particles are not packed with high density in the magnetic layer of a magnetic recording medium.

Examples of the aromatic dicarboxylic acid contained in an acid component of the polyester polyol used in the present invention include terephthalic acid, isophthalic acid, orthophthalic acid, and 1,5-naphthalic acid. Aromatic oxycarboxylic acids such as p-hydroxybenzoic acid and p-(hydroxyethoxy)benzoic acid, and/or aromatic tri- or tetracarboxylic acid such as trimellitic acid and pyromellitic acid can be used together with these aromatic dicarboxylic acids. Examples of the aliphatic dicarboxylic acid contained in the acid component of the polyester polyol used in the present invention include succinic acid, adipic acid, azelaic acid, sebacic acid, and dodecanedicarboxylic acid. As described later, aromatic or aliphatic dicarboxylic acids having a metal sulfonate group can be used together with these dicarboxylic acids.

Examples of the glycol component in the polyester polyol used in the present invention include ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, dipropylene glycol, 2,2,4-trimethyl-1,3-pentanediol, 1,4-cyclohexanedimethanol, ethylene oxide and/or propylene oxide adduct of bisphenol A, and ethylene oxide and/or propylene oxide adduct of hydrogenated bisphenol A. A triol or tetraol such as trimethylolethane, trimethylolpropane, glycerine, and pentaerythritol may be used together with these glycols.

The polyester polyol used for the preparation of the thermoplastic polyurethane contained in the composition of the present invention can be prepared by esterification between the above-mentioned acid component and glycol component. As the esterification, a known method such as a condensation reaction by heating can be used. In the esterification, a known catalyst for esterification such as a titanate type catalyst can be used.

Examples of the low molecular weight diol used for the preparation of the thermoplastic polyurethane contained in the composition of the present invention include ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, dipropylene glycol, 2,2,4-trimethyl-1,3-pentanediol, 1,4-cyclohexanedimethanol, and 1,4-bis(2-hydroxyethoxy)benzene. These low molecular weight diols may be used alone or in combination.

Examples of an organic diisocyanate used for the preparation of the thermoplastic polyurethane contained in the composition of the present invention include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4'-naphthalene diisocyanate, 3,3'-dimethyl-4,4'-biphenylene diisocyanate, 4,4'-diphenylene diisocyanate, 4,4'-diisocyanatodiphenyl ether, 1,5'-naphthalene diisocyanate, p-xylene diisocyanate, m-xylene diisocyanate, 1,3-diisocyanatomethylcyclohexane, 1,4-diisocyanatomethylcyclohexane, 4,4'-diisocyanatodicyclohexane, 4,4'-diisocyanatodicyclohexylmethane, and isophorone diisocyanate. These diisocyanates may be used alone or in combination.

The thermoplastic polyurethane contained in the composition of the present invention has e metal sulfonate group which is contained in an amount of 10 to 1000 equivalents/$10^6$ g of the polyurethane. In the case where the thermoplastic polyurethane has a metal sulfonate group of less than 10 equivalents/$10^6$ g of the polyurethane, a binder which includes the composition containing the thermoplastic polyurethane having a metal sulfonate group in such an amount does not satisfactorily disperse magnetic particles. In addition, when these binders are used for preparing a magnetic coating, the magnetic particles are not packed with a high density in the magnetic layer made of the magnetic coating. On the other hand, in the case where the thermoplastic polyurethane has a metal sulfonate group which is contained in an amount of more than 1000 equivalents/$10^6$ g of the polyurethane, the polyurethane shows poor solubility in a solvent and hence is not suitable for practical use.

As described later, the thermoplastic polyurethane contained in the composition of the present invention is obtained by the reaction of at least the above-mentioned polyester polyol, low molecular weight diol, and organic diisocyanate. Any of these components can contain a metal sulfonate group; preferably, part of or the whole polyester polyol has metal sulfonate groups.

It is preferred that the polyester polyol used for the present invention is prepared by the use of a dicarboxylic acid having a metal sulfonate group as a part of the acid component. The dicarboxylic acid having a metal sulfonate group can be either an aromatic dicarboxylic acid or an aliphatic dicarboxylic acid. Examples of a dicarboxylic acid component having a metal sulfonate group include sodium 5-sulfoisophthalate, potassium 5-sulfoisophthalate, sodium 2-sulfoterephthalate, and potassium 2-sulfoterephthalate. The dicarboxylic acid component having a metal sulfonate group is preferably contained in the polyurethane in an amount of 0.5 mol% or more, and more preferably 1 to 50 mol % based on the total moles of the carboxylic acid component. The polyester polyol having a metal sulfonate group is used alone or in combination. The polyester polyol can be used together with a polyester polyol having no metal sulfonate group.

The thermoplastic polyurethane contained in the composition of the present invention has a urethane group of 1200 to 3000 equivalents/$10^6$ g of the polyurethane. Hereinafter, the equivalence of a urethane group in $10^6$ grams of polyurethane will also be referred to as the concentration of the urethane group. When 4,4'-diphenylmethane diisocyanate (hereinafter, referred to as MDI) is used as the organic diisocyanate, the concentration of a urethane group is represented by the following formula:

Concentration of a urethane group (equivalent/$10^6$ g) =

$$\frac{\text{Charged amount of } MDI}{\text{Charged amount of all components}} \times \frac{1}{125} \times 10^6$$

wherein the value 125 is obtained by dividing the molecular weight of the MDI by the number of isocyanate groups in one molecule of MDI (i.e., 2).

In the case where the concentration of a urethane group is less than 1200 equivalents/$10^6$ g of the polyurethane, the thermoplastic polyurethane obtained is soft. In addition, when the polyurethane thus obtained is formed into a pellet shape, blocking occurs among the pellets of the thermoplastic polyurethane. Thus, a polyurethane having a urethane group of less than 1200 equivalents/$10^6$ g of the polyurethane is not suitable for practical use. The blocking occurring during the production of the polyurethane makes it difficult to produce the polyurethane, and a product obtained using such a polyurethane is difficult to treat. On the other hand, in the case where the concentration of a urethane group is more than 3000 equivalents/$10^6$ g of the polyurethane, although a blocking does not occur, the polyurethane will have a poor solubility in a solvent. In addition, when the polyurethane is used together with other resins, the polyurethane has poor miscibility with them. As a result, the binder which contains the composition of the present invention does not satisfactorily disperse the magnetic particles. In addition, when the binder is used for preparing a magnetic coating, the magnetic particles are not packed with high density in a magnetic layer made of the magnetic coating.

The thermoplastic polyurethane contained in the composition of the present invention can be prepared by known methods. For example, the bulk polymerization method is employed in which the polyester polyol, the low molecular weight diol, and the organic diisocyanate are rapidly mixed and heated on a conveyor belt to be polymerized. Alternatively, the melt polymerization method is employed in which these materials are polymerized while being kneaded by a single-screw extruder or a multi-screw extruder. Generally, the molecular weight of the polyurethane obtained after being subjected to these polymerization methods is not sufficiently high. Therefore, the polyurethane thus obtained may be further subjected to a curing step, namely, subjected to solid-phase polymerization, whereby a thermoplastic polyurethane having the desired molecular weight can be obtained. The preferred mixing ratio of the components for the preparation of the thermoplastic polyurethane is set so that the proportion of NCO groups of the organic diisocyanate is preferably 0.5 to 1.5, and more preferably 0.8 to 1.2, based on the number of total OH groups including OH groups of the polyester polyol and OH groups of the low molecular weight diol.

According to the present invention, as described above, the thermoplastic polyurethane having a sulfonic group can be prepared by a polymerization method using no solvent, such as bulk polymerization and melt polymerization, with control of the concentration of the sulfonic group and urethane group, possessed by the resulting polyurethane resin, within a predetermined value. Thus, the thermoplastic polyurethane having a sulfonic group can be obtained in a solid state, e.g., in a pellet shape. A thermoplastic polyurethane having a sulfonic group in a solid state or a composition containing the same can be transported and stored more easily, compared with a thermoplastic polyurethane having a sulfonic group in a solution state obtained by the conventional solution polymerization method. If the solvent is removed from a conventionally prepared polyurethane solution, blocking occurs in the remaining solid even at room temperature; therefore, it is necessary to treat the conventional polyurethane with a sulfonic group in a solution state. In contrast, since blocking does not occur in the above-mentioned polyurethane at room temperature, the composition of the present invention containing the polyurethane can be treated in a solid state. In addition, the composition of the present invention does not contain a solvent, so that it can be used together with any solvent in accordance with its use. Accordingly, the composition of the present invention can be widely applied to a coating, an adhesive, and the like in addition to a binder for a magnetic recording medium.

The thermoplastic polyurethane composition of the present invention can contain a higher aliphatic acid metal salt in addition to the above-mentioned specific polyurethane. Preferably, the higher aliphatic acid metal salt is contained in an amount of 0.01 to 1.0 part by weight based on 100 parts by weight of the thermoplastic polyurethane. The higher aliphatic acid metal salt functions as an anti-blocking agent. Even in the case where the composition of the present invention does not contain the higher aliphatic acid metal salt, blocking does not occur therein in the vicinity of room temperature; however, blocking may occur at a high temperature (e.g., 60° C. or more) during a drying step, a curing step, and the like of the production process. The addition of the higher aliphatic acid metal salt can prevent the blocking even at a high temperature. In the case where the content of the higher aliphatic acid metal salt is less than 0.01 part by weight, the effect of the higher aliphatic acid metal salt as an anti-blocking agent is not obtained, and blocking occurs at high temperature. In the case where the content of the higher aliphatic acid metal salt is more than 1.0 part by weight, blocking can be prevented at a high temperature; however, when a magnetic coating for a magnetic recording medium is prepared using a binder containing such a composition (i.e., composition containing a higher aliphatic acid metal salt of more than 1.0 part by weight), filter clogging will occur during the step of filtering the magnetic coating.

The higher aliphatic acid metal salt used herein is a metal salt of a saturated aliphatic acid having 14 to 30 carbon atoms. The preferred examples of the higher aliphatic acid metal salt include calcium stearate, magnesium stearate, zinc stearate, magnesium lignocerate, zinc lignocerate, calcium montonate, magnesium montanate, and zinc montonate. These higher aliphatic acid metal salts may be used alone or in combination.

As a method for mixing the higher aliphatic acid metal salt with the composition of the present invention, methods known in the art can be used. For example, the higher aliphatic acid metal salt is mixed with any raw material for the thermoplastic polyurethane, and then the raw materials are subjected to polymerization. In the course of this polymerization, the higher aliphatic acid metal salt is incorporated in a polyurethane resin. Alternatively, the higher aliphatic acid metal salt is mixed with the thermoplastic polyurethane obtained by polymerization. The latter method is further classified into a method using a blender, a method using a twin-screw extruder, and the like.

The thermoplastic polyurethane composition of the present invention can contain at least one compound selected from the group consisting of an organic tin compound and tertiary amine. As described later, the purpose of these compounds is to employ them as catalysts for the reaction of forming urethane and/or as catalysts for curing a magnetic coating using the thermoplastic polyurethane composition. The thermoplastic polyurethane composition contains at least one compound selected from the group consisting of an organic tin compound and tertiary amine preferably in an amount of 0.001 to 0.1 part by weight, and more preferably 0.005 to 0.05 part by weight based on 100 parts by weight of the polyurethane. A compound which functions as a catalyst for the reaction of forming urethane is preferably used. In general, the thermoplastic polyurethane is prepared by the bulk polymerization method or the melt polymerization method, as described above. The molecular weight of the resulting thermoplastic polyurethane obtained after being subjected to the bulk polymerization or the melt polymerization is not sufficiently high. In order to obtain a polymer having higher molecular weight, the thermoplastic polyurethane is preferably further subjected to solid-state polymerization, i.e., a curing step. However, the reaction rate of the solid-state polymerization is low; therefore, unless the above-mentioned compound which functions as a catalyst is used, the curing step lasts for a long period of time, resulting in poor productivity. In addition, in the case where a magnetic coating is produced using a binder containing the composition of the present invention which does not contain these compounds, the reactivity of the polyurethane in magnetic coating with polyisocyanate markedly decreases. Thus, the magnetic coating is not sufficiently cured. In the case where the content of the above-mentioned compound is less than 0.001 part by weight, the above described catalytic effect cannot be obtained. In the case where the content of the compound is more than 0.1 part by weight, at the stage of polymerization of the thermoplastic polyurethane and/or reaction with the polyisocyanate in the case where the thermoplastic polyurethane is used as a magnetic coating, the reaction proceeds too fast, or a side reaction arises. As a result, masses in a gel state are generated, causing a defective product.

As the organic tin compound and tertiary amine added to the composition of the present invention, known compounds which function as a catalyst for the reaction of forming urethane are used. Preferred examples of the organic tin compound include dibutyltin dilaurate, dibutyltin diacetate, dibutyltin thiocarboxylate, dibutyltin dimaleate, dibutyltin mercaptide, dioctyltin mercaptide, and dioctyltin thiocarboxylate. Preferred examples of the tertiary amine include triethylamine, N,N'-dimethylcyclohexylamine, N,N,N',N'-tetramethylethylenediamine, N,N,N',N",N"-pentamethyldiethylenetriamine, triethylenediamine, N,N'-dimethylpiperadine, 1,2-dimethylimidazole, N-methylmorphorine, dimethylaminoethanol, and bis(2-dimethylaminoethyl)ether. These organic tin compounds and/or tertiary amine can be used alone or in combination.

As a method for mixing these organic tin compounds and/or tertiary amine with the composition of the present invention, known methods can be used. For example, one or more of these compounds are mixed with any raw material for the thermoplastic polyurethane, and then the raw materials are subjected to polymerization. In the course of this polymerization, one or more of these compounds is incorporated in a polyurethane resin. Alternatively, one or more of these compounds is mixed with the thermoplastic polyurethane obtained by polymerization. The latter method is further classified into a method using a blender, a method using a twin-screw extruder, and the like. A method, in which one or more of these compounds are mixed with any raw material for the thermoplastic polyurethane before polymerization, is preferred.

The melt viscosity of the thermoplastic polyurethane contained in the composition of the present invention is preferably in the range of 1000 poises to 20000 poises at 200° C. In the case where the melt viscosity is less than 1000 poises, magnetic particles are satisfactorily dispersed in a binder in a varnish state that contains the composition and a solvent; however, when being dried, the composition is insufficient for forming a coating film. That is, the coating film thus obtained has poor durability and surface smoothness. In the case where the melt viscosity is more than 20000 poises, magnetic particles are not satisfactorily dispersed in a binder containing the composition and the viscosity of the magnetic coating containing the binder increases. Accordingly, when a magnetic coating is prepared using the composition having a melt viscosity of more than 20000 poises, problems are likely to be caused during steps such as mixing, transferring, and coating. Thus, the composition having such a melt viscosity is not suitable for a practical use.

The thermoplastic polyurethane composition of the present invention can be used in any shape-such as a pellet shape, a flake shape, and a sheet shape. Among these shapes, a pellet shape is preferred because of its large specific surface area. When the specific surface area of the composition is large, the solubili- ty of the composition in a solvent increases.

The thermoplastic polyurethane composition of the present invention can further include other additives such as plasticizers (e.g., dibutyl phthalate, triphenyl phosphate), lubricants (e.g., dioctylsulfosodium succinate, t-butylphenol polyethylene ether, sodium ethylnaphthalenesulfonate, dilauryl succinate, zinc stearate, soy bean lecithin, silicone oil), various antistatic agents, UV absorbents (e.g., substituted benzotriazoles), antioxidants (e.g., phenol derivatives), and antihydrolysis agents (e.g., carbodiimides).

The magnetic recording medium of the present invention includes a substrate and a magnetic layer formed on the substrate, wherein the magnetic layer includes magnetic particles and a binder. The binder includes the thermoplastic polyurethane composition of the present invention. The magnetic recording medium of the present invention can be formed by coating the magnetic coating containing the composition of the present invention and the magnetic particles onto the substrate.

As the substrate used for the magnetic recording medium of the present invention, any substrate in a film or sheet shape, which is usually used as a substrate for the magnetic recording medium, can be used. Specific examples of the substrate include a polyethylene terephthalate film, a polypropylene film, and a cellulose acetate film.

In addition to the composition of the present invention, the binder can contain electron beam curable or UV curable resins such as other polyurethane resins, a vinyl chloride-vinyl acetate copolymer, ethyl cellulose, nitrocellulose, a polyester resin, an epoxy resin, and an acrylonitrile-butadiene copolymer.

As the magnetic particles, any magnetic particles generally used for the magnetic recording medium can be used. Examples of the magnetic particles includes $\gamma$-$Fe_2O_3$ having a spinal structure, $CrO_3$, cobalt-ferrite, cobalt-adsorbed iron oxide, and ferro-magnetic Fe—Co—Ni alloy.

In addition to the binder for the magnetic recording medium, the thermoplastic polyurethane composition of the present invention can also be used for the following purposes: a coating, an adhesive, a sealant, a water repellent, a floor material, an artificial leather, a fiber treatment agent, an elastic fiber material, a cushion material, a sheet, a belt, a film, a roller, a gear, a damping material, a tube, a packing material, a sole of a shoe, and the like.

EXAMPLES

Hereinafter, the present invention will be described by way of illustrative examples and comparative examples. It is noted that the present invention is not limited to these examples. In each of the following examples, "parts by weight" is referred to as "parts" unless otherwise stated. The reduced viscosity of a thermoplastic polyurethane resin was measured in a mixed solvent of phenol/tetrachloroethane (6/4 by weight) at 30° C.

Experimental method

A thermoplastic polyurethane composition obtained in each of the following examples was evaluated for its properties as a binder for a magnetic recording medium.

(1) Preparation of magnetic recording medium:

A mixture containing the following components was kneaded for 5 hours using a paint shaker.

| | |
|---|---|
| Thermoplastic polyurethane composition | 12 parts |
| Vinylite VAGH[1] | 18 parts |
| (manufactured by UCC Corporation) | |
| Co-containing $\gamma$-$Fe_2O_3$ particles (BET = 41 $m^2$/g) | 120 parts |
| Methyl ethyl ketone | 135 parts |
| Toluene | 135 parts |

[1] Vinyl chloride-vinyl acetate copolymer

First, 12 parts of COLONATE-L (manufactured by Nippon Polyurethane Industry Co., Ltd.) which is a reaction product of tolylene diisocyanate and trimethylol propane was added to the above mixture. The resultant mixture was stirred for another 30 minutes and then filtered with a filter having an average opening size of 1 μm. The magnetic coating thus obtained was coated on a polyethyleneterephthalate (PET) film to a thickness of 50 μm by the use of a doctor blade with a gap of 50μm. The coated film was dried by heating to remove the solvent therefrom. The magnetic layer of the resultant magnetic recording medium was evaluated for its properties as follows:

(2) Dispersibility of magnetic particles: The surface gloss of the magnetic layer was measured with a gloss-meter (GLOSS CHECKER IG326, manufactured by Horiba).

(3) Packing rate of magnetic particles: The magnetic recording medium was soaked in a silicone oil. Voids of the magnetic layer were determined on the basis of the amount of silicone oil impregnated in the magnetic layer, whereby the packing rate was evaluated.

(4) Surface smoothness of magnetic layer: The surface roughness of the magnetic layer was measured and evaluated with a surface texture and contour measuring instrument (SURFCOM 304B, manufactured by Tokyo Precision Instruments).

The curing property of the resultant thermoplastic polyurethane composition was evaluated as follows:

A coated film was formed by the same method as that used in the above item 1, except that Vinylite VAGH and Co-containing $\gamma$-$Fe_2O_3$ particles were not used. The film thus obtained was soaked in methyl ethyl ketone. The ratio of the weight of the undissolved part of the film to the weight of the film before being soaked is defined as a gel fraction.

REFERENCE EXAMPLE

Preparation of polyester polyol having a metal sulfonate group

To a reactor equipped with a thermometer, a stirrer, and a partial reflux condenser, 43500 parts of terephthalic acid, 39300 parts of isophthalic acid, 114600 parts of adipic acid, 7400 parts of sodium 5-sulfoisophthalate, 42600 parts of ethylene glycol, 87900 parts of neopentyl glycol, 62100 parts of 1,4-cyclohexanedimethanol, and 6.0 parts of tetrabutyl titanate were added, and the mixture thus obtained was subjected to an esterification reaction at a temperature in the range of 180° to 230° C. for 5 hours. Then, the reaction mixture was vacuumed to a pressure of 5 mmHg over 30 minutes. During this period, the temperature of the reaction mixture increased to 240° C. The reaction mixture was subjected to a polycondensation reaction at 240° C. under a reduced pressure of 0.3 mmHg for 10 minutes. Polyester polyol A thus obtained had an OH value of 79.3 mg KOH/g and a number average molecular weight of 1414. According to NMR analysis, Polyester polyol A had the following composition:

| | |
|---|---|
| Terephthalic acid | 20 mol % |
| Isophthalic acid | 18 mol % |
| Sodium 5-sulfoisophthalate | 2 mol % |
| Adipic acid | 60 mol % |
| Ethylene glycol | 35 mol % |
| Neopentyl glycol | 35 mol % |
| 1,4-Cyclohexanedimethanol | 30 mol % |

In the above table, the ratio of the respective acid components is based on the total acid components, and the ratio of the respective glycol components is based on the total glycol components.

Polyester polyols B to E respectively having the composition shown in Table 1 were prepared in the same way as in Polyester polyol A.

TABLE 1

| | polyester polyols | | | | |
|---|---|---|---|---|---|
| | A | B | C | D | E |
| Acid components (mol %) | | | | | |
| Aromatic dicarboxylic acid: | | | | | |
| Terephthalic acid | 20 | 28 | 48 | | 20 |
| Isophthalic acid | 18 | | | | 20 |
| ISN[1] | 2 | 2 | 2 | 2 | |
| Aliphatic dicarboxylic acid: | | | | | |
| Adipic acid | 60 | 70 | 50 | 98 | 60 |
| Aromatic/Aliphatic | 40/60 | 30/70 | 50/50 | 2/98 | 40/60 |
| Glycol components (mol %) | | | | | |
| Ethylene glycol | 35 | | 50 | | 35 |
| 1,4-Butanediol | | 75 | | 75 | |
| Neopentyl glycol | 35 | 25 | 50 | 25 | 35 |
| 1,4-Cyclohexanedimethanol | 30 | | | | 30 |
| OH value (mg KOH/g) | 79.3 | 100.1 | 109.4 | 102.6 | 79.0 |
| Number average molecular weight | 1414 | 1120 | 1025 | 1094 | 1420 |

[1]Sodium 5-sulfoisopthalate

Example 1

Polyester polyol A stored in a tank at 100° C., MDI stored in a tank at 50° C., and propylene glycol stored in a tank at 25° C. were transferred using a gear pump in an amount shown below into a twin-screw extruder having a screw diameter of 30 mm (L/D=40). A thermoplastic polyurethane was continuously obtained by melt-polymerization while being kneaded under the condition that a final resin temperature was 230° C.

| | |
|---|---|
| Polyester polyol A | 108.7 parts |
| Propylene glycol | 5.8 parts |
| MDI | 36.0 parts |

The thermoplastic polyurethane In a molten state was discharged in a strand shape from a die of the twin-screw extruder, cooled with water in a cooling bath, and formed into a pellet shape with a strand cutter. The pellet thus obtained was dried in a stream of nitrogen at 60° C. for 30 hours and cured-to obtain a thermoplastic polyurethane in a pellet shape. The thermoplastic polyurethane in a pellet shape contained a metal sulfonate group of 65 equivalents/$10^6$ g, a urethane group of 1900 equivalents/$10^6$ g, and had a reduced viscosity ($\eta_{sp}/c$) of 1.06. In this thermoplastic polyurethane pellet, blocking did not occur at room temperature. A magnetic layer of a magnetic recording medium using this thermoplastic polyurethane was evaluated for its properties. The dispersibility and packing rate of magnetic particles in the magnetic layer, and the surface smoothness of the magnetic layer were respectively 91 (surface gloss), 21.0% (voids), and 0.023 μm (surface roughness), as shown in Table 2. These results were satisfactory.

Examples 2 to 5

Thermoplastic polyurethanes were prepared in the same way as in Example 1, except that the respective components and the amounts of the components were changed as shown in Table 2. In all of the pellets of the thermoplastic polyurethanes thus obtained, blocking did not occur at room temperature. The properties of magnetic layers of magnetic recording media using these thermoplastic polyurethanes were satisfactory as shown in Table 2.

Comparative Example 1

A thermoplastic polyurethane was prepared in the same way as in Example 1, except that the amount of each component was changed so as to attain a urethane group concentration of 1190 equivalents/$10^6$ g. The properties of a magnetic layer of a magnetic recording medium using the thermoplastic polyurethane were satisfactory as shown in Table 2. However, An the pellet of the thermoplastic polyurethane, blocking markedly occurred at room temperature. Thus, it was not easy to treat the pellet.

Comparative Example 2

A thermoplastic polyurethane was prepared in the same way as in Example 1, except that the amount of each component was changed so as to attain a urethane group concentration of 3200 equivalents/$10^6$ g. The thermoplastic polyurethane thus obtained was insoluble in a mixed solvent of methyl ethyl ketone/toluene (weight ratio 1/1), so that it was not able to form a magnetic recording medium, using this thermoplastic polyurethane.

Comparative Example 3

A thermoplastic polyurethane was prepared in the same way as in Example 1, with the following alterations:

Polyester polyol D containing aromatic dicarboxylic acid and aliphatic dicarboxylic acid in a molar ratio of 2:98 and 3-methyl-1,5-pentanediol as a low molecular weight diol were used. The amount of each component (i.e., Polyester polyol D, 3-methyl-1,5-pentanediol, and MDI) was determined so as to attain a urethane group concentration of 2820 equivalents/$10^6$ g. The properties of a magnetic layer of a magnetic recording medium using this thermoplastic polyurethane were satisfactory as shown in Table 2. However, in the pellet of the thermoplastic polyurethane, blocking occurred markedly. Thus, it was not easy to treat the pellet.

Comparative Example 4

A thermoplastic polyurethane was prepared in the same way as in Example 1, except that Polyester polyol E having no metal sulfonate group was used. The properties of a magnetic layer of a magnetic recording medium using this thermoplastic polyurethane were unsatisfactory as shown in Table 2.

TABLE 2

|  | Example No. |  |  |  |  | Comparative Example No. |  |  |  |
|---|---|---|---|---|---|---|---|---|---|
|  | 1 | 2 | 3 | 4 | 5 | 1 | 2 | 3 | 4 |
| Compositon: |  |  |  |  |  |  |  |  |  |
| Polyester polyol | A | A | A | B | C | A | A | D | E |
| Low molecular weight diol | PG[1] | PG | PG | MPG[2] | PG | PG | PG | MPD[3] | PG |
| Organic diisocyanate | MDI | MDI | MDI | MDI | MDI | MDI | MDI | MDI | MDI |
| Metal Sulfonate (equivalent/$10^6$) | 65 | 69 | 59 | 60 | 64 | 76 | 45 | 53 | 0 |
| Concentration of a urethane group (equivalent/$10^6$) | 1900 | 1765 | 2380 | 2480 | 2340 | 1190 | 3200 | 2820 | 1900 |
| Reduced viscosity ($\eta sp/C$) | 1.06 | 1.09 | 1.30 | 1.36 | 0.98 | 1.10 | 1.22 | 1.01 | 1.32 |
| Blocking (room temperature) | NO | NO | NO | NO | NO | YES | NO | YES | NO |
| Surface gloss | 91 | 92 | 99 | 95 | 99 | 94 | — | 85 | 60 |
| Voids (%) | 21.0 | 21.5 | 21.8 | 23.0 | 22.2 | 20.3 | — | 23.7 | 27.6 |
| Surface roughness (μm) | 0.023 | 0.025 | 0.021 | 0.025 | 0.019 | 0.026 | — | 0.032 | 0.048 |

[1] propylene glycol
[2] 2-methyl-1,3-propanediol
[3] 3-methyl-1,5-pentanediol

Example 6

Polyester polyol A stored in a tank at 100° C., MDI stored in a tank at 50° C., and propylene glycol stored in a tank at 25° C. were transferred using a gear pump in an amount shown below into a twin-screw extruder having a screw diameter of 30 mm (L/D-40). A thermoplastic polyurethane was continuously obtained by melt-polymerization while being kneaded under the condition that the final resin temperature was 230° C.

| | |
|---|---|
| Polyester polyol A | 108.7 parts |
| Propylene glycol | 5.8 parts |
| MDI | 36.0 parts |

The thermoplastic polyurethane in a molten state was discharged in a strand shape from the die of a twin-screw extruder, cooled with water in a cooling bath, and formed into a pellet shape with a strand cutter. The pellets thus obtained were successively charged into a Nauta mixer having a capacity of 100 L (manufactured by Hosokawa Micron Co., Ltd.). When 50000 parts of pellets were charged in the Nauta mixer, 10 parts of calcium stearate (i.e., 0.02 part based on 100 parts of the thermoplastic polyurethane) was added. The resultant mixture was dried with stirring in a stream of nitrogen at 60° C. for 30 hours and cured to obtain a thermoplastic polyurethane composition in a pellet shape. The thermoplastic polyurethane composition in a pellet shape contained a metal sulfonate group of 65 equivalents/$10^6$ g, a urethane group of 1900 equivalents/$10^6$ g, and had a reduced viscosity ($\eta_{sp}/c$) of 1.06. In the pellet of this thermoplastic polyurethane composition, blocking did not occur while the pellet was dried and cured (60° C.). A magnetic layer of a magnetic recording medium using this thermoplastic polyurethane composition was evaluated for its properties. The dispersibility and packing rate of magnetic particles in the magnetic layer, and the surface smoothness of the magnetic layer were respectively 91 (surface gloss), 21.0% (voids), and 0.023 μm (surface roughness), as shown in Table 3. These results were satisfactory.

Examples 7 to 12

Thermoplastic polyurethane compositions were prepared in the same way as in Example 6, except that the respective components and the amounts of the components were changed as shown in Table 3. In all of the pellets of the thermoplastic polyurethane compositions thus obtained, blocking did not occur even at 60° C. The properties of magnetic layers of magnetic recording media using these thermoplastic polyurethane compositions were satisfactory as shown in Table 3.

Comparative Example 5

A thermoplastic polyurethane composition was prepared in the same way as in Example 6, except that the amount of each component was changed so as to attain a urethane group concentration of 1190 equivalents/$10^6$ g. The properties of a magnetic layer of a magnetic recording medium using the thermoplastic polyurethane composition were satisfactory as shown in Table 3. However, in the pellet of the thermoplastic polyurethane, blocking occurred markedly at 60° C. Thus, it was not easy to treat the pellet.

Comparative Example 6

A thermoplastic polyurethane composition was prepared in the same way as in Example 6, except that the amount of each component was changed so as to attain a urethane group concentration of 3200 equivalents/$10^6$ g. The thermoplastic polyurethane composition thus obtained was insoluble in a mixed solvent of methyl ethyl ketone/toluene (weight ratio 1/1), so that it was not able to form a magnetic recording medium, using this thermoplastic polyurethane composition.

Comparative Example 7

A thermoplastic polyurethane composition was prepared in the same way as in Example 6, except that calcium stearate was added in an amount of 1.2 parts based on 100 parts of the thermoplastic polyurethane. The properties of a magnetic layer of a magnetic recording medium using this composition were satisfactory as shown in Table 3 and blocking did not occur at 60° C. However, when a magnetic coating was filtered, a filter was clogged with the magnetic particles in the magnetic layer.

Comparative Example 8

A thermoplastic polyurethane composition was prepared in the same way as in Example 6, with the following alterations:

Polyester polyol D containing aromatic dicarboxylic acid and aliphatic dicarboxylic acid in a molar ratio of 2:98 and 3-methyl-1,5-pentanediol as a low molecular weight diol were used. The amount of each component (i.e., Polyester polyol D, 3-methyl-1,5-pentanediol, and MDI) was determined so as to attain a urethane group concentration of 2820 equivalents/$10^6$ g. The properties of a magnetic layer of a magnetic recording layer using this thermoplastic polyurethane composition was satisfactory as shown in Table 3. However, in the pellet of the thermoplastic polyurethane composition, blocking occurred markedly. Thus, it was not easy to treat the pellet.

Comparative Example 9

A thermoplastic polyurethane composition was prepared in the same way as in Example 6, except that Polyester polyol D having no metal sulfonate group was used. The properties of a magnetic layer of a magnetic recording medium using this thermoplastic polyurethane composition were unsatisfactory as shown in Table 3.

(manufactured by Hosokawa Micron Co., Ltd.). When 50000 parts of pellets were charged in the Nauta mixer, 10 parts of calcium stearate (i.e., 0.02 part based on 100 parts of the thermoplastic polyurethane) was added. The resultant mixture was dried with stirring in a stream of nitrogen at 60° C. for 30 hours and cured to obtain a thermoplastic polyurethane composition in a pellet shape. The thermoplastic polyurethane composition in a pellet shape contained a metal sulfonate group of 65 equivalents/$10^6$ g, a urethane group of 1900 equivalents/$10^6$ g, and had a reduced viscosity ($\eta_{sp}/c$) of 1.32. In the pellet of this thermoplastic polyurethane composition, blocking did not occur while the pellet was dried and cured (60° C.). A magnetic layer of a magnetic recording medium using this thermoplastic polyurethane composition was evaluated for its properties. The dispersibility and filling rate of magnetic particles in the magnetic layer, and the surface smoothness of the magnetic layer were respectively 91 (surface gloss), 21.0% (voids), and 0.023 μm (surface roughness), as shown in Table 4. These results were

TABLE 3

| | Example No. | | | | | | | Comparative Example No. | | | | |
|---|---|---|---|---|---|---|---|---|---|---|---|---|
| | 6 | 7 | 8 | 9 | 10 | 11 | 12 | 5 | 6 | 7 | 8 | 9 |
| Composition: | | | | | | | | | | | | |
| Polyester polyol | A | A | A | A | A | B | C | A | A | A | D | E |
| Low molecular weight diol | PG | PG | PG | PG | PG | MPG | PG | PG | PG | PG | MPD | PG |
| Organic diisocyanate | MDI | MDI | MDI | MDI | MDI | MDI | MDI | MDI | MDI | MDI | MDI | MDI |
| Higher aliphatic acid metal salt (parts) | St-Ca[1] (0.02) | St-Ca (0.30) | St-Mg[2] (0.02) | St-Ca (0.02) | St-Ca (0.02) | St-Mg (0.02) | St-Mg (0.02) | St-Ca (0.02) | St-Ca (0.02) | St-Ca (1.20) | St-Ca (0.02) | St-Ca (0.02) |
| Metal Sulfonate (equivalent/$10^6$) | 65 | 65 | 65 | 69 | 59 | 60 | 64 | 76 | 45 | 65 | 53 | 0 |
| Concentration of a urethane group (equivalent/$10^6$) | 1900 | 1900 | 1900 | 1765 | 2380 | 2480 | 2340 | 1190 | 3200 | 1900 | 2820 | 1900 |
| Reduced viscosity ($\eta sp/C$) | 1.06 | 1.06 | 1.06 | 1.09 | 1.30 | 1.36 | 0.98 | 1.10 | 1.22 | 1.06 | 1.01 | 1.32 |
| Blocking (at 60° C.) | NO | NO | NO | NO | NO | NO | NO | YES | NO | NO | YES | NO |
| Surface gloss | 91 | 91 | 91 | 92 | 99 | 95 | 99 | 94 | — | 91 | 85 | 60 |
| Voids (%) | 21.0 | 21.0 | 21.0 | 21.5 | 21.8 | 23.0 | 22.2 | 20.3 | — | 21.0 | 23.7 | 27.6 |
| Surface roughness (μm) | 0.023 | 0.023 | 0.023 | 0.025 | 0.021 | 0.025 | 0.019 | 0.026 | — | 0.023 | 0.032 | 0.048 |

[1] Calcium stearate
[2] Magnesium stearate

Example 13

Polyester polyol A, MDI, and propylene glycol were stored in tanks at 100° C., 50° C., and 25° C., respectively. Dibutyltin dilaurate was added to Polyester polyol A so that the amount of dibutyltin dilaurate was 0.02 part based on 100 parts of a thermoplastic polyurethane to be obtained after reaction, and the contents in the tank were stirred for about 30 minutes. Then, the components of the respective tanks were transferred using a gear pump in an amount shown below into a twin-screw extruder having a screw diameter of 30 mm (L/D=40). A thermoplastic polyurethane was continuously obtained by melt-polymerization while being kneaded under the condition that a final resin temperature was 230° C.

| | |
|---|---|
| Polyester polyol A | 108.7 parts |
| Propylene glycol | 5.8 parts |
| MDI | 36.0 parts |

The thermoplastic polyurethane in a molten state was discharged in a strand shape from a die of the twin-screw extruder, cooled with water in a cooling bath, and formed into a pellet shape with a strand cutter. The pellets thus obtained were successively charged into a Nauta mixer satisfactory. The curing property of the thermoplastic polyurethane composition was evaluated to be satisfactory. The gel fraction of the composition was 75%.

Examples 14 to 19

Thermoplastic polyurethane compositions were prepared in the same way as in Example 13, except that the respective components and the amounts of the components were changed as shown in Table 4. In all of the pellets of the thermoplastic polyurethane compositions thus obtained, blocking did not occur at 60° C. The properties of magnetic layers of magnetic recording media using these thermoplastic polyurethane compositions and the gel fraction of the composition were satisfactory as shown in Table 4.

Comparative Example 10

A thermoplastic polyurethane composition was prepared in the same way as in Example 13, except that the amount of each component was changed so as to attain a urethane group concentration of 1190 equivalents/$10^6$ g. The properties of a magnetic layer of a magnetic recording medium using this thermoplastic polyurethane composition were satisfactory as shown in Table 4. However, in the pellet of the thermoplastic polyurethane composition, blocking occurred markedly at 60° C. Thus, it was not easy to treat the pellet. In addition, the thermoplastic polyurethane composition had a gel fraction as low as 30%, revealing poor curing properties.

Comparative Example 11

A thermoplastic polyurethane composition was prepared in the same way as in Example 13, except that the amount of each component was changed so as to obtain a urethane group concentration of 3200 equivalents/$10^6$ g. The thermoplastic polyurethane composition thus obtained was insoluble in a mixed solvent of methyl ethyl ketone/toluene (weight ratio 1/1), so that it was not able to form a magnetic recording medium, using this thermoplastic polyurethane composition. Also, it was not able to evaluate a curing property.

Comparative Example 12

A thermoplastic polyurethane composition was prepared in the same way as in Example 13, except that dibutyltin dilaurate was not used. In the pellet of this thermoplastic polyurethane composition, blocking did not occur even at 60° C., and the properties of a magnetic layer of a magnetic recording medium using this thermoplastic polyurethane composition were satisfactory as shown in Table 4. However, the composition has a gel fraction of 5%, revealing that a curing reaction hardly proceeded.

Comparative Example 13

A thermoplastic polyurethane composition was prepared in the same way as in Example 13, except that dibutyltin dilaurate was added in an amount of 0.12 part based on 100 part& of the thermoplastic polyurethane. A coating film was formed using this thermoplastic polyurethane composition. The gel fraction of the coating film was 96%. However, a great number of masses in a gel state were generated in the coating film. Thus, this coating film was not suitable for practical use.

Comparative Example 14

A thermoplastic polyurethane composition was prepared in the same way as in Example 13, with the following alterations:

Polyester polyol D containing aromatic dicarboxylic acid and aliphatic dicarboxylic acid in a molar ratio of 2:98 and 3-methyl-1,5-pentanediol as a low molecular weight diol were used. The amount of each component (i.e., Polyester polyol D, 3-methyl-1,5-pentanediol, and MDI) was determined so as to attain a urethane group concentration of 2820 equivalents/$10^6$ g. The properties of a magnetic layer of a magnetic recording medium using this thermoplastic polyurethane composition were satisfactory as shown in Table 4. However, in the pellet of the thermoplastic polyurethane composition, blocking occurred markedly. Thus, it was not easy to treat the pellet.

Comparative Example 15

A thermoplastic polyurethane was prepared in the same way as in Example 13, except that Polyester polyol E having no metal sulfonate group was used. The properties of a magnetic layer of a magnetic recording medium using this thermoplastic polyurethane composition were unsatisfactory as shown in Table 4.

TABLE 4

|  | Example No. |  |  |  |  |  |  | Comparative Example No. |  |  |  |  |  |
|---|---|---|---|---|---|---|---|---|---|---|---|---|---|
|  | 13 | 14 | 15 | 16 | 17 | 18 | 19 | 10 | 11 | 12 | 13 | 14 | 15 |
| Compositon: | | | | | | | | | | | | | |
| Polyester polyol | A | A | A | A | A | B | C | A | A | A | A | D | |
| Low molecular weight diol | PG | PG | PG | PG | PG | MPG | PG | PG | PG | PG | PG | MPD | PG |
| Organic diisocyanate | MDI | MDI | MDI | MDI | MDI | MDI | MDI | MDI | MDI | MDI | MDI | MDI | MDI |
| Organic tin compound or tertiary amine (parts) | DBTDL[1] (0.02) | DBTDL (0.005) | TEA[2] (0.02) | DBTDL (0.02) | DBTDL (0.02) | DBTDL (0.02) | DBTDL (0.02) | DBTDL (0.02) | DBTDL (0.02) | — — | DBTDL (0.12) | DBTDL (0.02) | DBTDL (0.02) |
| Metal Sulfonate (equivalent/$10^6$) | 65 | 65 | 65 | 69 | 59 | 60 | 64 | 76 | 45 | 65 | 65 | 53 | 0 |
| Concentration of a urethane group (equivalent/$10^6$) | 1900 | 1900 | 1900 | 1765 | 2380 | 2480 | 2340 | 1190 | 3200 | 1900 | 1900 | 2820 | 1900 |
| Reduced viscosity (ηsp/C) | 1.32 | 1.32 | 1.32 | 1.40 | 1.44 | 1.36 | 1.20 | 1.25 | 1.32 | 1.06 | 1.68 | 1.21 | 1.42 |
| Blocking (at 60° C.) | NO | NO | NO | NO | NO | NO | NO | YES | NO | NO | NO | YES | NO |
| Gel ratio (%)[3] | 75 | 7 55 | 63 | 68 | 80 | 88 | 85 | 30 | — | 5 | 96 | 87 | 73 |
| Surface gloss | 91 | 91 | 91 | 92 | 99 | 95 | 99 | 94 | — | 91 | 87 | 85 | 60 |
| Voids (%) | 21.0 | 21.0 | 21.0 | 21.5 | 21.8 | 23.0 | 22.2 | 20.3 | — | 21.0 | 24.0 | 23.7 | 27.6 |
| Surface roughness (μm) | 0.023 | 0.023 | 0.023 | 0.025 | 0.021 | 0.025 | 0.019 | 0.026 | — | 0.023 | 0.034 | 0.032 | 0.048 |

[1]Dibutyl tin dilaurate
[2]Triethyl amine
[3]Curing condition: 60° C., 20 min.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A thermoplastic polyurethane composition comprising a thermoplastic polyurethane obtained by reacting, employing a bulk polymerization method or a melt polymerization method, at least the following components A, B, and C:

(A) a polyester polyol having a number average molecular weight of 500 to 5,000, containing a polyol component and an acid component, said acid component including aromatic dicarboxylic acid and aliphatic dicarboxylic acid, the molar ratio of said aromatic dicarboxylic acid to said aliphatic dicarboxylic acid being 5:95 to 90:10;

(B) a low molecular weight diol having a molecular weight of less than about 200; and (C) an organic diisocyanate, wherein said thermoplastic polyurethane has a metal sulfonate group concentration of 10 to 1,000 equivalents/$10^6$ g of said polyurethane and a urethane group concentration of 1,200 to 3,000 equivalents/$10^6$ g of said polyurethane; and wherein said thermoplastic polyurethane has a melt viscosity of 1,000 to 20,000 poises at 200° C.; and wherein said composition further comprises a metal salt of a saturated aliphatic acid having 14 to 30 carbon atoms in an amount of 0.01 to 1.0 parts by weight based on 100 parts by weight of the thermoplastic polyurethane.

2. A thermoplastic polyurethane composition according to claim 1, wherein the number average molecular weight of the polyester polyol is in the range of 500 to 2000.

3. A thermoplastic polyurethane composition according to claim 1, comprising at least one compound selected from the group consisting of an organic tin compound and tertiary amine in an amount of 0.001 to 0.1 part by weight based on 100 parts by weight of the thermoplastic polyurethane.

4. A magnetic recording medium comprising a substrate and a magnetic layer formed on the substrate, wherein the magnetic layer includes magnetic particles and a binder, and the binder includes the thermoplastic polyurethane composition of claim 1.

5. A thermoplastic polyurethane composition comprising a thermoplastic polyurethane obtained by reacting at least the following components A, B, and C:

(A) a polyester polyol having a number average molecular weight of 500 to 5,000, consisting of a polyol component and an acid component, said acid component consisting of aromatic dicarboxylic acid and aliphatic dicarboxylic acid, the molar ratio of said aromatic dicarboxylic acid to said aliphatic dicarboxylic acid being 5:95 to 90:10;

wherein said aliphatic dicarboxylic acid is selected from the group consisting of succinic acid, adipic acid, azelaic acid, sebacic acid, dodecanedicarboxylic acid, and metal sulfonates thereof;

and wherein said polyol component is selected from the group consisting of ethylene glycol; propylene glycol; 1,3-propanediol; 1,4-butanediol; 1,5-pentanediol; 3-methyl-1,5-pentanediol; 1,6-hexanediol; neopentyl glycol; diethylene glycol; dipropylene glycol; 2,2,4-trimethyl-1,3-pentanediol; 1,4-cyclohexanedimethanol; ethylene oxide adduct of bisphenol A; propylene oxide adduct of bisphenol A; ethylene oxide adduct of hydrogenated bisphenol A; propylene oxide adduct of hydrogenated bisphenol A; trimethylolethane; trimethylolpropane; glycerine, and pentaerythritol;

(B) a low molecular weight diol having a molecular weight of less than 200; and (C) an organic diisocyanate, wherein said thermoplastic polyurethane has a metal sulfonate group concentration of 10 to 1,000 equivalents/$10^6$ g of said polyurethane and a urethane group concentration of 1,200 to 3,000 equivalents/$10^6$ g of said polyurethane.

6. A thermoplastic polyurethane composition of claim 5, wherein said aromatic dicarboxylic acid is selected from the group consisting of terephthalic acid; isophthalic acid; orthophthalic acid; 1,5-naphthalic acid; 5-sulfoisophthalic acid; p-hydroxybenzoic acid; p-(hydroxyethoxy)benzoic acid; trimellitic acid; pyromellitic acid; and metal sulfonates thereof.

7. A thermoplastic polyurethane composition of claim 5, wherein said low molecular weight diol is selected from the group consisting of ethylene glycol; propylene glycol; 1,3-propanediol; 2-methyl-1,3-propanediol; 1,4-butanediol; 1,5-pentanediol; 1,6-hexanediol; 1,4-cyclohexanedimethanol; neopentyl glycol; diethylene glycol; dipropylene glycol; 2,2,4-trimethyl-1,3-pentanediol; 1,4-bis(2-hydroxyethoxy)benzene; and mixtures thereof.

8. A thermoplastic polyurethane composition of claim 5, wherein said organic diisocyanate is selected from the group consisting of 2,4-tolylene diisocyanate; 2,6-tolylene diisocyanate; p-phenylene diisocyanate; diphenylmethane diisocyanate; m-phenylene diisocyanate; hexamethylene diisocyanate; tetramethylene diisocyanate; 3,3'-dimethoxy-4,4'-biphenylene diisocyanate; 2,4'-naphthalene diisocyanate; 3,3'-dimethyl-4,4'-biphenylene diisocyanate; 4,4'-diphenylene diisocyanate; 4,4'-diisocyanatodiphenyl ether; 1,5'-naphthalene diisocyanate; p-xylene diisocyanate; m-xylene diisocyanate; 1,3-diisocyanatomethylcyclohexane; 1,4-diisocyanatomethylcyclohexane; 4,4'-diisocyanatodicyclohexane; 4,4'-diisocyanato-dicyclohexylmethane; isophorone diisocyanate; and mixtures thereof.

9. A thermoplastic polyurethane composition of claim 1, wherein said aliphatic acid metal salt is selected from the group consisting of calcium stearate, magnesium stearate, zinc stearate, magnesium lignocerate, zinc lignocerate, calcium montanate, magnesium montanate, and zinc montanate.

10. A thermoplastic polyurethane composition of claim 3, wherein said organic tin compound is selected from the group consisting of dibutyltin dilaurate, dibutyltin diacetate, dibutyltin thiocarboxylate, dibutyltin dimaleate, dibutyltin mercaptide, dioctyltin mercaptide, and dioctyltin thiocarboxylate.

11. A thermoplastic polyurethane composition of claim 3, wherein said tertiary amine is selected from the group consisting of triethylamine; N,N'-dimethylcyclohexylamine; N,N,N',N'-tetramethyl ethylenediamine; N,N,N',N'',N''-pentamethyldiethylenetriamine; triethylenediamine; N,N'-dimethylpiperadine; 1,2-dimethylimidazole; N-methylmorpholine; dimethylaminoethanol; and bis(2-dimethylaminoethyl)ether.

12. A thermoplastic polyurethane composition of claim 1, wherein blocking does not occur below 60° C.

13. A thermoplastic polyurethane composition of claim 5, wherein said aliphatic dicarboxylic acid is selected from the group consisting of succinic acid, adipic acid, azelaic acid, and sebacic acid.

14. A thermoplastic polyurethane composition of claim 5, wherein said glycol component is selected from the group consisting of ethylene glycol, propylene glycol, 1,3-propanediol, 1,4-butanediol, 3-methyl-1,5-pentanediol, neopentyl glycol, and 1,4-cyclohexanedimethanol.

15. A thermoplastic polyurethane composition of claim 6, wherein said aromatic dicarboxylic acid is selected from the group consisting of terephthalic acid, isophthalic acid, orthophthalic acid, and metal sulfonates thereof.

16. A thermoplastic polyurethane composition of claim 7, wherein said low molecular weight diol is selected from the group consisting of propylene glycol, 1,3-propanediol, 2-methyl-1,3-propanediol and mixtures thereof.

17. A thermoplastic polyurethane composition of claim 8, wherein said organic diisocyanate is 4,4'-diphenylmethane diisocyanate.

18. A thermoplastic polyurethane composition comprising a thermoplastic polyurethane obtained by reacting the following components A, B, and C:

(A) a polyester polyol having a number average molecular weight of 500 to 5,000, which is obtained by reacting at least the following components I, II, III, and IV:

(I) at least one aromatic dicarboxylic acid selected from the group consisting of terephthalic acid, isophthalic acid, orthophthalic acid, and metal sulfonates thereof:

(II) at least one aliphatic dicarboxylic acid selected from the group consisting of succinic acid, adipic acid, azelaic acid, and sebacic acid;

(III) at least one dicarboxylic acid having a metal sulfonate group selected from the group consisting of sodium 5-sulfoisophthalate and potassium 5-sulfoisophthalate; and (IV) at least one glycol selected from the group consisting of ethylene glycol, propylene glycol, 1,3-propanediol, 1,4-butanediol, 3-methyl-1,5-pentanediol, neopentyl glycol, and 1,4-cyclohexanedimethanol;

wherein the molar ratio of said aromatic dicarboxylic acid to said aliphatic dicarboxylic acid is from 5:95 to 90:10;

(B) a low molecular weight diol having a molecular weight of less than 200 selected from the group consisting of propylene glycol, 1,3-propanediol, 2-methyl-1,3-propanediol, and mixtures thereof; and (C) 4,4'-diphenylmethane diisocyanate, wherein said thermoplastic polyurethane has a metal sulfonate group concentration of 10 to 1,000 equivalents/$10^6$ g of said polyurethane and a urethane group concentration of 1,200 to 3,000 equivalents/$10^6$ g of said polyurethane.

* * * * *

UNITED STATES PATENT AND TRADEMARK OFFICE
CERTIFICATE OF CORRECTION

PATENT NO. : 5,695,884
DATED : December 9, 1997
INVENTOR(S) : Ishimaru et al.

It is certified that error appears in the above-identified patent and that said Letters Patent is hereby corrected as shown below:

COLUMNS 17 and 18:

In Table 4, last column (Comparative Example No. 15), please change entry from blank space to -- E --.

In Table 4, second column (Example No. 14), please change entry from 7 55 to -- 55 --.

Signed and Sealed this

Seventeenth Day of March, 1998

Attest:

BRUCE LEHMAN

Attesting Officer

Commissioner of Patents and Trademarks